(12) United States Patent
Hatchman et al.

(10) Patent No.: US 10,550,482 B2
(45) Date of Patent: Feb. 4, 2020

(54) CORROSION INHIBITORS

(71) Applicant: RHODIA OPERATIONS, Paris (FR)

(72) Inventors: Kevan Hatchman, Selby (GB); Alan Fellows, Birmingham (GB); Christopher Raymond Jones, Cheslyn Hay (GB); Gareth Collins, Stourbridge (GB)

(73) Assignee: RHODIA OPERATIONS, Paris (FR)

( * ) Notice: Subject to any disclaimer, the term of this patent is extended or adjusted under 35 U.S.C. 154(b) by 784 days.

(21) Appl. No.: 14/373,640

(22) PCT Filed: Jan. 30, 2013

(86) PCT No.: PCT/EP2013/051758
§ 371 (c)(1),
(2) Date: Jul. 22, 2014

(87) PCT Pub. No.: WO2013/113740
PCT Pub. Date: Aug. 8, 2013

(65) Prior Publication Data
US 2015/0010429 A1 Jan. 8, 2015

(30) Foreign Application Priority Data

Jan. 30, 2012 (GB) .................................. 1201542.6

(51) Int. Cl.
*C23F 11/16* (2006.01)
*C23F 11/10* (2006.01)
(Continued)

(52) U.S. Cl.
CPC ............. *C23F 11/163* (2013.01); *C09K 8/54* (2013.01); *C23F 11/04* (2013.01); *C23F 11/10* (2013.01)

(58) Field of Classification Search
None
See application file for complete search history.

(56) References Cited

U.S. PATENT DOCUMENTS 3,640,998 A * 2/1972 Mansfield-Dersher et al. ............
C07H 15/08
252/396
4,705,665 A * 11/1987 Malik ....................... C09K 8/74
134/3

(Continued)

FOREIGN PATENT DOCUMENTS

WO      WO 86/06417 A1    11/1986
WO      WO 96/01245 A1    1/1996
(Continued)

*Primary Examiner* — Joseph D Anthony

(57) ABSTRACT

The invention provides the use of a surfactant as a corrosion inhibitor, wherein the surfactant is selected from derivatives of alkyl polyglucosides and derivatives of terpene alkoxylates, and mixtures thereof, provided that the derivatives are not sulfosuccinates. Also provided is a method of preventing or reducing corrosion of a metal component that is in contact with, or will be in contact with, an aqueous fluid, wherein the method comprises providing a surfactant and applying the surfactant to the metal component or adding the surfactant to the aqueous fluid that is in contact with, or will be in contact with, the metal component, wherein the surfactant is selected from derivatives of alkyl polyglucosides and derivatives of terpene alkoxylates, and mixtures thereof, provided that the derivatives are not sulfosuccinates.

9 Claims, 7 Drawing Sheets

APG + 1,3 dichloro-isopropanol + sodium 3-chloro,2-hydroxy-propylsulfonate
(Cross linking agent) (Functionalising agent)

Hydroxypropyl sulfonate functionalised APG example reaction scheme for forming a functionalised APG (51) Int. Cl.
*C23F 11/04* (2006.01)
*C09K 8/54* (2006.01)

(56) References Cited

U.S. PATENT DOCUMENTS

| | | | | |
|---|---|---|---|---|
| 5,674,823 A * | 10/1997 | Ricca | ............ | C07C 43/11 |
| | | | | 510/102 |
| 5,817,885 A * | 10/1998 | Ricca | ............ | C07C 43/11 |
| | | | | 510/102 |
| 6,627,612 B1 | 9/2003 | O'Lenick, Jr. et al. | | |
| 7,507,399 B1 | 3/2009 | O'Lenick, Jr. | | |
| 2006/0135683 A1 | 6/2006 | Adam et al. | | |
| 2008/0272342 A1* | 11/2008 | Guzmann | ............ | C02F 5/12 |
| | | | | 252/392 |
| 2011/0049428 A1* | 3/2011 | Zanetto | ............ | C11D 1/72 |
| | | | | 252/389.24 |
| 2011/0220358 A1* | 9/2011 | Robinson | ............ | B01D 15/00 |
| | | | | 166/301 |
| 2012/0046215 A1* | 2/2012 | Hodge | ............ | C11D 1/008 |
| | | | | 510/470 |
| 2012/0058926 A1* | 3/2012 | Hodge | ............ | C11D 1/345 |
| | | | | 510/109 |
| 2012/0071388 A1* | 3/2012 | Hodge | ............ | C11D 1/008 |
| | | | | 510/470 |
| 2014/0135239 A1* | 5/2014 | Fellows | ............ | C09K 8/54 |
| | | | | 507/255 |
| 2015/0126417 A1* | 5/2015 | Hatchman | ............ | C09K 8/58 |
| | | | | 507/219 |

FOREIGN PATENT DOCUMENTS

| | | |
|---|---|---|
| WO | WO 2007063069 A2 | 6/2007 |
| WO | WO 2009023724 A2 | 2/2009 |
| WO | WO 2010026457 A1 | 3/2010 |

\* cited by examiner

Figure 1: example reaction scheme for forming a functionalised APG

Figure 2: example reaction scheme for forming a functionalised terpene alkoxylate Figure 3: Corrosion inhibition performance over a 15 hour period Figure 4 - Corrosion inhibition performance over a 15 hour period Figure 5 - Corrosion inhibition performance over a 15 hour period Figure 6 - Corrosion inhibition performance over a 15 hour period Figure 7 - Corrosion inhibitor efficiency after 15 hours

CORROSION INHIBITORS

CROSS-REFERENCE TO RELATED APPLICATIONS

This application is a U.S. national stage entry under 35 U.S.C. § 371 of International Application No. PCT/EP2013/051758 filed Jan. 30, 2013, which claims priority to GB Application No. 1201542.6 filed on Jan. 30, 2012, the whole content of this application being herein incorporated by reference for all purposes.

TECHNICAL FIELD OF THE INVENTION

The present invention relates to the use of surfactants as corrosion inhibitors, especially in oilfield applications, wherein the corrosion inhibiting surfactants are selected from derivatives of alkyl polyglucosides and derivatives of terpene alkoxylates, where the derivatives are not sulfosuccinate derivatives.

BACKGROUND TO THE INVENTION

Alkyl polyglucosides (APGs) are surfactants known for use in the personal care industry, e.g. for hair and skin cleaning and conditioning products. APGs are synthesised from the reaction of glucose and a fatty alcohol. APGs are polymeric in nature and can contain one or more glucoside units. APGs are usually provided as a mixture of products that differ in terms of the extent of polymerisation. Therefore when referring to the degree of polymerisation (dp) for APGs this will be given as the average (mean) degree of polymerisation of the mixture. For example, a 50:50 mixture of an APG with a dp=1 and an APG with a dp=2 will provide an average degree of polymerisation of 1.5.

APG with dp = 1

APG with dp = 2

An APG can be reacted with a functionalising agent to create a functionalised polymer. A cross-linking agent will usually be used in such a reaction to create a 'cross-polymer'.

Functional groups that can be added include quaternary compounds, phosphates, carboxymethylates, maleates, sulfonates (including hydroxyalkylsulfonates), succinates and sulfosuccinates. The synthesis of these functionalised APGs is described in U.S. Pat. Nos. 6,627,612 and 7,507,399.

Alkoxylated terpenes are primarily used as emulsifiers, solubilisers, wetting agents and low foaming surfactants in agrochemical, home care, institutional and industrial applications. These terpene alkoxylates are obtained by the reaction of the terpene (nopol) with alkoxides such as ethylene oxide, propylene oxide and/or butylene oxide. This is described in, for example, US patent publication 2006/0135683.

A derivative of a terpene alkoxylate can be obtained by reacting the terpene alkoxylate with a functionalising agent. For example, an ether carboxylic acid derivative can be prepared by the reaction of the terpene alkoxylate with sodium monochloroacetate (SMCA) at 80° C. The alkyl ether carboxylate may be prepared using a slight molar excess (1.1-1.2 moles) of SMCA per mole of alkoxylate in the presence of an alkali (NaOH). The resultant mixture can be acidified and washed with water to remove any residual sodium chloride.

It is well known that steel and other metal surfaces can corrode in the presence of aqueous environments; especially acidic aqueous environments such as those found in subterranean wells, which can pass through formations containing high concentrations of corrosive materials such as hydrogen sulphide, carbon dioxide, brine, and the like.

Alloy technology and galvanisation have resulted in materials that can withstand some incidental contact with corrosive environments, but in a number of industrial applications (such as hydrocarbon exploration, recovery and refining, and chemical processing) more prolonged contact with corrosive environments occurs. In particular, during the working life of an oil or gas well various conduits and other components in the production zone encounter considerable acidic corrosion.

Corrosion inhibitors are therefore widely used in oil and gas production wells and pipelines to reduce corrosion of metal components and therefore prevent consequential production equipment failures.

Imidazolines are commonly used as corrosion inhibitors, and are viewed as the industry standard, but are known to have poor aquatic toxicity. Other known corrosion inhibitors for use in oilfields are based on fatty amine, fatty amidoamine or quaternary ammonium chemistries. However, these compounds are also harmful to aquatic species. These known corrosion inhibitors can also exhibit poor biodegradability.

There is therefore a continuing need for corrosion inhibitors, for use in the oil and gas industry and other industrial applications, which have improved aquatic toxicity and biodegradability.

SUMMARY OF THE INVENTION

The present invention provides, in a first aspect, the use of a surfactant as a corrosion inhibitor, wherein the surfactant is selected from derivatives of alkyl polyglucosides and derivatives of terpene alkoxylates, and mixtures thereof.

In particular, the corrosion inhibiting surfactant can be used to inhibit the corrosion of a metal component, that is, or will be, in contact with an aqueous fluid, in order to prevent or reduce corrosion of the metal component.

The present invention also provides, in a second aspect, a method of preventing or reducing corrosion of a metal component that is in contact with, or will be in contact with, an aqueous fluid, wherein the method comprises:
 providing a surfactant, wherein the surfactant is selected from derivatives of alkyl polyglucosides and derivatives of terpene alkoxylates, and mixtures thereof; and
 applying the surfactant to the metal component or adding the surfactant to the aqueous fluid that is in contact with, or will be in contact with, the metal component.

The corrosion inhibiting surfactants of the present invention can have good compatibility with non-ionic, anionic and amphoteric corrosion inhibitors, therefore permitting corrosion inhibitor formulations to be produced that comprise combinations of two or more different corrosion inhibitors.

Accordingly, in a third aspect there is provided a corrosion inhibitor formulation that comprises one or more corrosion inhibiting surfactant, wherein the surfactant is selected from derivatives of alkyl polyglucosides and derivatives of terpene alkoxylates, and mixtures thereof, together with a corrosion inhibitor that is not a corrosion inhibiting surfactant in accordance with the invention.

The surfactants of the present invention have been surprisingly identified as effective corrosion inhibitors. Further, they exhibit lower aquatic toxicity than imidazolines. Information regarding the toxicity of surfactants can be found in Chapter 9, Anionic surfactants, Ed: H W Stache, Surfactant Science Series, Vol: 56, Marcel Dekker (1996).

A further benefit is that the corrosion inhibiting surfactants of the invention can be tailored to have a molecular weight of greater than 700 Da, which would mean they would be classified as non bio-accumulating (according to the OSPAR Guidelines for Completing the Harmonised Offshore Chemical Notification Format (HOCNF) (Reference number: 2008-5), paragraph 38). In particular, derivatives of alkyl polyglucosides can be prepared having molecular weights of the order of about 2000 to 6000 Da and therefore these do not bio-accumulate in the environment.

Additionally, the corrosion inhibiting surfactants of the invention are beneficial in that they are biodegradable. It may also be that they can be cleaved by hydrolysis by acids or by bases.

Therefore the corrosion inhibiting surfactants provide a number of advantages over known corrosion inhibitors.

BRIEF DESCRIPTION OF THE DRAWINGS

For a detailed description of various embodiments of the invention, reference will now be made to the accompanying drawings, in which.

DETAILED DESCRIPTION OF THE INVENTION

The corrosion inhibiting surfactant used in the present invention may be one or more surfactant which is a derivative of an alkyl polyglucoside and/or one or more surfactant which is a derivative of a terpene alkoxylate, wherein the derivative is not a sulfosuccinate.

Only one corrosion inhibiting surfactant may be used, or a combination of more than one corrosion inhibiting surfactant may be used. When more than one is used, these may all be derivatives of alkyl polyglucosides or may all be derivatives of terpene alkoxylates or they may be a mixture of derivatives of alkyl polyglucosides and derivatives of terpene alkoxylates.

In one embodiment, the total number of carbon atoms in the (or each) corrosion inhibiting surfactant is from 12 to 500, such as from 13 to 450, or from 14 to 400, or from 15 to 350. It may be from 12 to 300, or from 16 to 250, or from 18 to 200. Preferably it is from 20 to 300, such as from 22 to 250, or from 24 to 200.

In one embodiment, the corrosion inhibiting surfactant has a molecular weight of greater than 700 Da. This can be beneficial for some applications, as it means they would be classified as non bio-accumulating. However, in an alternative embodiment, the surfactant has a molecular weight of 700 Da or less.

It may be that the corrosion inhibiting surfactant has a molecular weight of from 300 to 3000 Da, such as from 350 to 2500 Da, or from 400 to 2200 Da, or from 450 to 2000 Da.

In one embodiment, the corrosion inhibiting surfactant has a molecular weight of greater than 700 Da and less than or equal to 3000 Da. In one such embodiment, it has a molecular weight of from 705 to 3000 Da, such as from 710 to 2500 Da, or from 715 to 2200 Da, or from 720 to 2000 Da.

In another embodiment, the corrosion inhibiting surfactant has a molecular weight of from 300 to 700 Da, such as from 350 to 675 Da or from 400 to 650 Da.

When the corrosion inhibiting surfactant comprises a derivative of an alkyl polyglucoside, this surfactant may suitably be selected from reaction products of an alkyl polyglucoside with a cross linking agent and a functionalising agent.

The crosslinking agent is suitably of formula X—$R^a$—X, where each X, which may be the same or different, is a halogen (e.g. chloro, fluoro or bromo) and $R^a$ is a C2-C18 hydrocarbon (e.g. alkyl or alkenyl), that may optionally be substituted and that may be branched or unbranched. Optional substituent groups which may replace one or more hydrogens in the hydrocarbon include hydroxy, amino, amido, nitro and alkoxy. Optional substituent groups which may replace one or more carbons in the hydrocarbon include O, N and S.

It may be that $R^a$ comprises a C2-C18 (e.g. C2-C12) alkanyl or alkenyl group, or an alkoxylated (e.g. ethoxylated, propoxylated or butoxylated) derivative thereof, and it may optionally be substituted (e.g. one or more one or more hydrogen may be replaced with substituent groups selected from hydroxy, amino, amido, nitro and alkoxy groups) and it may be branched or unbranched. $R^a$ may, for example, be a C2-C12 alkanyl or alkenyl group that may optionally be substituted (e.g. with one or more one or more hydrogen being replaced with substituent groups selected from hydroxy groups and amino groups) and that may be branched or unbranched.

In one embodiment $R^a$ is a branched or unbranched C2-C8 alkanyl (e.g. C2, C3, C4 or C5 alkanyl) that may optionally be substituted (e.g. with one or more one or more hydrogen being replaced with substituent groups selected from hydroxy groups and amino groups). In one such embodiment X is chloro.

In one embodiment the crosslinking agent is:

Cl—CH₂CH(OH)CH₂Cl

The functionalising agent is suitably of formula X—$R^a$—Y, where X is a halogen (e.g. chloro, fluoro or bromo), $R^a$ is a C2-C18 hydrocarbon (e.g. alkyl or alkenyl), that may optionally be substituted and that may be branched or unbranched, and Y is selected from quaternary ammonium groups, sulfonate groups, sulfate groups, phosphate groups, and hydroxy groups. Optional substituent groups which may replace one or more hydrogens in the hydrocarbon include hydroxy, amino, amido, nitro and alkoxy. Optional substituent groups which may replace one or more carbons in the hydrocarbon include O, N and S.

In one embodiment, one or more carbon atoms in the hydrocarbon chain are replaced with oxygen.

It may be that $R^a$ comprises a C2-C18 (e.g. C2-C12) alkanyl or alkenyl group, or an alkoxylated (e.g. ethoxylated, propoxylated or butoxylated) derivative thereof, and it may optionally be substituted (e.g. one or more one or more hydrogen may be replaced with substituent groups selected from hydroxy, amino, amido, nitro and alkoxy groups) and it may be branched or unbranched.

$R^a$ may, for example, be a C2-C12 alkanyl or alkenyl group that may optionally be substituted (e.g. with one or more one or more hydrogen being replaced with substituent groups selected from hydroxy groups and amino groups) and that may be branched or unbranched.

In one embodiment $R^a$ is a branched or unbranched C2-C8 alkanyl (e.g. C2, C3, C4 or C5 alkanyl) that may optionally be substituted (e.g. with one or more one or more hydrogen being replaced with substituent groups selected from hydroxy groups and amino groups). In one such embodiment X is chloro.

Y is selected from quaternary ammonium groups, sulfonate groups, sulfate groups, phosphate groups, and hydroxy groups.

Quaternary ammonium groups may be of formula —N⁺R'₃ where each R' may be the same or different and may be selected from C1-C36 hydrocarbon groups (e.g. alkyl or alkenyl), that may optionally be substituted and that may be branched or unbranched. Optional substituent groups which may replace one or more hydrogens in the hydrocarbon include hydroxy, amino, amido, carboxy, nitro and alkoxy. Optional substituent groups which may replace one or more carbons in the hydrocarbon include O, N and S.

In one embodiment, each R' may be the same or different and is selected from C1-C36 branched or unbranched alkyl groups that may optionally be substituted (e.g. one or more one or more hydrogen may be replaced with substituent groups selected from hydroxy, amino, amido, carboxy, nitro and alkoxy groups).

Preferably one or more of the R' groups are selected from methyl, ethyl or propyl. It may be that two of the R' groups are selected from methyl, ethyl or propyl and the third R' group is selected from C1-C36 branched or unbranched alkyl groups, especially unbranched alkyl groups, more especially C6-C36 unbranched alkyl groups and most especially C10-C36 unbranched alkyl groups (e.g. C12-C30 unbranched alkyl groups).

Preferably at least some of the R' groups are unsubstituted. In one preferred embodiment all of the R' groups are unsubstituted.

Sulfonate groups may be of formula —SO₃M where M is selected from H and monovalent cations such as Na, K, and NH₄.

Sulfate groups may be of formula —SO₄M where M is selected from H and monovalent cations such as Na, K, and NH₄.

Phosphate groups may be of formula —OPO(OM)₂ where each M is independently selected from H and monovalent cations such as Na, K, and NH₄.

In one embodiment, the functionalising agent is selected from:

and mixtures thereof,
wherein
$R^1$ is selected from C6-C36 unbranched alkyl groups, and M is selected from H and monovalent cations such as Na, K, and NH₄.

The reactions that take place between alkyl polyglucosides and crosslinking agents and functionalising agents are described in more detail in U.S. Pat. No. 7,507,399 B1. As described in that document, the resultant product is a crosslinked polymer (crosslinked by —$R^a$— groups) but the degree of crosslinking depends of the ratio of crosslinking agent to hydroxy groups in the glucoside. Likewise, the functionalising agent will react with hydroxy groups in the glucoside and the number of groups —$R^a$—Y that replace hydroxy groups in the crosslinked glucosides will depend on the ratio of functionalising agent to hydroxy groups in the glucoside.

The alkyl polyglucosides from which the corrosion inhibiting surfactant can be derived may suitably have an alkyl group that is a C8 to C30 branched or unbranched alkyl group, such as a C8 to C25, C8 to C22, C9 to C20, C10 to C18, or C10 to C16 branched or unbranched alkyl group. In one embodiment it may be a C10 to C30 branched or unbranched alkyl group, such as a C10 to C24, or C10 to C18 branched or unbranched alkyl group.

In a preferred embodiment the alkyl polyglucoside from which the corrosion inhibiting surfactant is derived has an alkyl group that is a C12 to C30 branched or unbranched alkyl group, such as a C12 to C25, C12 to C24, C12 to C22, C12 to C20, C12 to C18, or C12 to C16 branched or unbranched alkyl group. In one such preferred embodiment the alkyl polyglucoside may have an alkyl group that is a C12 to C24 branched or unbranched alkyl group.

Preferably the alkyl group is unsubstituted.

The skilled reader will understand that, due to the method by which they are synthesized, alkyl polyglucosides are generally present as mixtures of alkyl polyglucosides, where there are varying numbers of carbon atoms in the alkyl radical and where there are varying degrees of polymerisation. Thus, when referring to alkyl polyglucosides, the alkyl radical is generally referred to as having a range of carbon atoms, which cover the minimum and maximum length of alkyl carbon chains present in the mixture, and the degree of polymerisation is the average (mean) degree of polymerisation of the mixture.

For the alkyl polyglucoside derived products, the polyglucoside may in one embodiment have a degree of polymerisation of from 1 to 15, and preferably from 1 to 10, e.g. from 1 to 9, from 1 to 8, from 1 to 7 or from 1 to 6. Typically it may be from 1 to 5 or from 1 to 4. In one embodiment for the alkyl polyglucoside derived products, the polyglucoside has a degree of polymerisation of from 1 to 3; more preferably from 1 to 2; for example from 1.1 to 1.8 or from 1.1 to 1.7; such as from 1.2 to 1.6; most preferably from 1.2 to 1.5.

As the skilled reader will appreciate, the degree of polymerisation can be measured by known techniques such as gel permeation chromatography.

In one embodiment, the alkyl polyglucoside is made up of units of formula (I) and/or (II):

(I)

(II)

wherein
R is a C8-30 alkyl group;
$R^1$, $R^2$, $R^3$ and $R^4$ are independently selected from the group consisting of hydrogen and —CH$_2$CH(OH)CH$_2$—$R^{12}$,
with the proviso that $R^1$, $R^2$, $R^3$ and $R^4$ are not all hydrogen;
$R^5$, $R^6$, $R^7$ $R^8$, $R^9$ and $R^{11}$ are independently selected from the group consisting of hydrogen and —CH$_2$CH(OH)CH$_2$—$R^{12}$,
and $R^{10}$ is selected from the group consisting of hydrogen, —CH$_2$CH(OH)(CH$_2$)$_x$—$R^{12}$, and with the proviso that $R^5$, $R^6$, $R^7$ $R^8$, $R^9$, $R^{10}$ and $R^{11}$ are not all hydrogen, wherein x=0 or 1,
and $R^{12}$ is a functional group selected from:

wherein $R^1$ is selected from C6-C36 unbranched alkyl groups, and
M is selected from H and monovalent cations such as Na, K, and NH$_4$, and
wherein the overall degree of polymerisation of the surfactant product (i.e. the average number of glucose units per alkyl group R) is from 1 to 15, preferably from 1 to 10, e.g. from 1 to 5.

In one embodiment the degree of polymerisation is from 1 to 5, e.g. from 1.1 to 1.8 (such as from 1.2 to 1.5).

The alkyl groups R in formula (I) and (II) are C8 to C30 branched or unbranched alkyl groups, such as C8 to C25 branched or unbranched alkyl groups, e.g. C9 to C22 branched or unbranched alkyl groups; more preferably C10 to C24 branched or unbranched alkyl groups, e.g. C10 to C18 branched or unbranched alkyl groups.

In a preferred embodiment the alkyl groups R (i.e. the alkyl group for the alkyl polyglucosides) are C12 to C30 branched or unbranched alkyl groups, such as C12 to C25, and most preferably C12 to C24 branched or unbranched alkyl groups. In one such embodiment the alkyl groups R in formula (III) and (IV) are C12 to C22 branched or unbranched alkyl groups, such as C12 to C20 branched or unbranched alkyl groups, e.g. C12 to C18 branched or unbranched alkyl groups or C12 to C16 branched or unbranched alkyl groups.

In one embodiment, the alkyl polyglucoside derivative is based on decyl polyglucoside or lauryl polyglucoside. In one preferred embodiment, the alkyl polyglucoside derivative is based on lauryl polyglucoside.

In one embodiment, the alkyl polyglucoside derivative is selected from those described in U.S. Pat. No. 7,507,399 B1.

It may be that the alkyl polyglucoside derivative is of formula (III):

(III)

wherein
n is an integer of 1 or more (e.g. from 1 to 20 or from 1 to 10), such as 2 or more, or 3 or more, and typically 4 or more;

R is selected from C8 to C30 branched or unbranched alkyl groups;

Y is selected from quaternary ammonium groups, sulfonate groups, sulfate groups, phosphate groups, and hydroxy groups.

Preferred options for R and Y are as described above. It may be that R is selected from C10 to C24 branched or unbranched alkyl groups; most preferably C12 to C24 branched or unbranched alkyl groups, e.g. C12 to C22 branched or unbranched alkyl groups. It may be that Y is a functional group selected from:

wherein $R^1$ is selected from C6-C36 unbranched alkyl groups, and

M is selected from H and monovalent cations such as Na, K, and $NH_4$.

In one embodiment, the alkyl polyglucoside derivative is selected from:
- Sodium Hydroxypropylsulfonate Decyl-Glucoside Crosspolymer
- Sodium Hydroxypropylsulfonate Lauryl-Glucoside Crosspolymer
- Sodium Hydroxypropylphosphate Laurylglucoside Crosspolymer
- Sodium Bis-Hydroxyethylglycinate Lauryl-Glucosides Crosspolymer
- Hydroxypropyltrimethylammmonium Coco glucosides Chloride
- Stearyldimethylammoniumhydroxypropyl Lauryl glucosides Chloride.

In one such embodiment, the alkyl polyglucoside derivative is selected from:
- Sodium Hydroxypropylsulfonate Lauryl-Glucoside Crosspolymer
- Sodium Hydroxypropylphosphate Laurylglucoside Crosspolymer
- Sodium Bis-Hydroxyethylglycinate Lauryl-Glucosides Crosspolymer
- Stearyldimethylammoniumhydroxypropyl Lauryl glucosides Chloride.

In one such embodiment, the alkyl polyglucoside derivative is selected from:
- Sodium Hydroxypropylsulfonate Lauryl-Glucoside Crosspolymer
- Stearyldimethylammoniumhydroxypropyl Lauryl glucosides Chloride.

When the corrosion inhibiting surfactant comprises a derivative of a terpene alkoxylate, the (or each) surfactant may suitably be an ester or ether of a terpene alkoxylate, provided that it is not a sulfosuccinate mono-ester or di-ester.

The ester may, in one embodiment, be a phosphate ester or a sulfate ester or a carbonate ester or a carboxylate ester.

The ether may, in one embodiment, be of formula —O—$R_m$—$R_n$, wherein $R_m$ is a C1-20 hydrocarbon divalent linking group and $R_n$ is a carboxylate or amide group.

$R_m$ may optionally be substituted and may be branched or unbranched. Optional substituent groups which may replace one or more hydrogens in the hydrocarbon include hydroxy, amino, amido, nitro and alkoxy. Optional substituent groups which may replace one or more carbons in the hydrocarbon include O, N and S. $R_m$ may suitably be a C1-20 alkylene or C2-20 alkenylene group, or C1-20 alkoxyene group; e.g. a C1-C12 or a C1-C8 alkylene or alkoxyene; more preferably a C2, C3, C4, C5 or C6 alkylene or alkoxyene group; most preferably a C2, C3, or C4 alkylene or alkoxyene group.

$R_n$ is a carboxylate or amide group and is therefore suitably of formula —$CO_2R_p$ or —C(=O)$NHR_p$ or —C(=O)$N(R_p)_2$ where $R_p$ is selected from C1-C36 hydrocarbon groups (e.g. alkyl or alkenyl) that may optionally be substituted and that may be branched or unbranched. When there is more than one $R_p$ these may be the same or different. Optional substituent groups which may replace one or more hydrogens in the hydrocarbon include hydroxy, amino, amido, carboxy, nitro and alkoxy. Optional substituent groups which may replace one or more carbons in the hydrocarbon include O, N and S.

In one embodiment, $R_p$ is selected from C1-C36 branched or unbranched alkyl groups that may optionally be substituted, more especially C6-C36 unbranched alkyl groups and most especially C10-C36 unbranched alkyl groups (e.g. C12-C30 unbranched alkyl groups).

The terpene alkoxylate derivative used as a corrosion inhibiting surfactant in the present invention may be of formula (III):

wherein $R^x$ is selected from:
(a) R'—(O—$C_2H_4$)$_x$—, where R' is a C8-C30 terpene group, and x is an integer from 1 to 50; or
(b) R'—(O—$C_3H_6$)$_x$—, where R' is a C8-C30 terpene group, and x is an integer from 1 to 50; or
(c) R'—(O—$C_4H_8$)$_x$—, where R' is a C8-C30 terpene group, and x is an integer from 1 to 50; or
(d) R'—(O—$C_yH_{2y}$)$_{x'}$(O—$C_2H_4$)$_{x''}$—, where R' is a C8-C30 terpene group, y is 3 or 4, x' is an integer from 1 to 50, and x" is an integer from 1 to 50, and wherein Z is an ester group (e.g. a phosphate ester group or a sulfate ester group or a carbonate ester group or a carboxylate ester group) or an ether group, provided that it is not a sulfosuccinate mono-ester or di-ester.

Z may, in one embodiment, be an ether of formula —O—$R_m$—$R_n$, as defined above.

In one preferred embodiment, Z is an ester group (e.g. a phosphate ester group or a sulfate ester group or a carbonate ester group or a carboxylate ester group).

Z may be of formula (IV-a):

where $R^m$ is selected from H and C1-C30 branched or unbranched alkyl and C2-C30 branched or unbranched alkenyl groups, which may optionally be substituted, and $R^n$ is selected from H, $R^x$ and C1-C30 branched or unbranched alkyl and C2-C30 branched or unbranched alkenyl groups, which may optionally be substituted, wherein optional substituent groups (which may replace one or more hydrogens) include hydroxy, amino, nitro, halo and alkoxy.

Z may be of formula (IV-b):

(IV-b)

where $R'''$ is selected from H and C1-C30 branched or unbranched alkyl and C2-C30 branched or unbranched alkenyl groups, which may optionally be substituted, wherein optional substituent groups (which may replace one or more hydrogens) include hydroxy, amino, nitro, halo and alkoxy.

Z may be of formula (IV-c):

(IV-c)

where $R'''$ is selected from H and C1-C30 branched or unbranched alkyl and C2-C30 branched or unbranched alkenyl groups, which may optionally be substituted, wherein optional substituent groups (which may replace one or more hydrogens) include hydroxy, amino, nitro, halo and alkoxy.

Z may be of formula (IV-d):

(IV-d)

where $R'''$ is selected from H and C1-C30 branched or unbranched alkyl and C2-C30 branched or unbranched alkenyl groups, which may optionally be substituted, wherein optional substituent groups (which may replace one or more hydrogens) include hydroxy, amino, nitro, halo and alkoxy,
provided that Z is not a sulfosuccinate mono-ester or di-ester.

Preferably, if Z is of formula (IV-d), then if $R'''$ is substituted the substituent groups are not carboxy or sulfonate groups.

Preferably, if Z is of formula (IV-d), then if $R'''$ is substituted this is only with groups selected from hydroxy, amino, amido, nitro, halo, alkoxy, ether or ester.

More preferably, if Z is of formula (IV-d), then if $R'''$ is substituted this is only with groups selected from hydroxy, amino, nitro, halo and alkoxy.

In one embodiment, which may apply to any of the above options (IV-a) to (IV-d), any alkyl or alkenyl groups present in the group Z are selected from C1-C24 branched or unbranched alkyl and C2-C24 branched or unbranched alkenyl groups, which may optionally be substituted; preferably they are selected from C1-C18 branched or unbranched alkyl and C2-C18 branched or unbranched alkenyl groups, which may optionally be substituted; most preferably they are selected from C1-C12 branched or unbranched alkyl and C2-C12 branched or unbranched alkenyl groups, which may optionally be substituted.

In one embodiment, which may apply to any of the above options (IV-a) to (IV-d), $R'''$ is H.

In one embodiment, option (IV-a) applies and $R''$ is H or $R^x$.

The terpene alkoxylate from which the surfactant can be derived preferably has an HLB of less than 10, e.g. from 0 to 7, more preferably 5 or less, e.g. from 1 to 5, such as from 2 to 4 or from 3 to 5 or from 3 to 4.

The degree of alkoxylation for the terpene alkoxylate is suitably from 1 to 50, such as from 1 to 40, from 1 to 30, from 1 to 24, from 1 to 20, or from 1 to 12. The alkoxylating groups may suitably be selected from C1-C4 alkoxy group, such as ethoxy, propoxy or butoxy, or combinations thereof. For example, the invention envisages, inter alia, ethoxylation, propoxylation, butoxylation, and block alkoxylation with (EO)(PO), (EO)(BO), (PO)(EO) and (BO)(EO).

In one embodiment, the (or each) surfactant is derived from an ethoxylated terpene group, a propoxylated terpene group, a butoxylated terpene group, an (EO)(PO), (EO)(BO), (PO)(EO) or (BO)(EO) block alkoxylated terpene group.

In one preferred embodiment, the (or each) surfactant is derived from an ethoxylated C8-30 terpene group, a propoxylated C8-30 terpene group, a butoxylated C8-30 terpene group, an (EO)(PO), (EO)(BO), (PO)(EO) or (BO)(EO) block alkoxylated C8-30 terpene group.

In one preferred embodiment, the (or each) surfactant is derived from an ethoxylated C8-22 terpene group, a propoxylated C8-22 terpene group, a butoxylated C8-22 terpene group, an (EO)(PO), (EO)(BO), (PO)(EO) or (BO)(EO) block alkoxylated C8-22 terpene group.

The skilled reader will also understand that alkoxylated terpenes are generally present as mixtures where there are varying numbers of alkoxylation. Thus, when referring to these alkoxylated products, the degree of alkoxylation is the average (mean) degree of alkoxylation of the mixture.

As the skilled reader will appreciate, for the options a, b and c for the product of formula (III), the value of x is the degree of alkoxylation, whilst for option d the combined value of x' and x" is the degree of alkoxylation. Preferably, x, x' and x" are each independently from 1 to 30, more preferably from 1 to 20, such as from 1 to 15, e.g. from 1 to 12. In one embodiment, therefore, x, x' and x" are each independently 1, 2, 3, 4, 5, 6, 7, 8, 9, 10, 11 or 12. It may be that x, x' and x" are each independently from 1 to 6 or alternatively it may be that x, x' and x" are each independently from 7 to 12.

As the skilled reader will appreciate, the degree of alkoxylation can be measured by known techniques such as gel permeation chromatography.

In one embodiment, the surfactant is derived from an ethoxylated terpene, a propoxylated terpene or a butoxylated terpene, and the degree of alkoxylation is from 1 to 30, more preferably from 1 to 20, such as from 1 to 15, e.g. from 1 to 12 and most preferably from 1 to 10. In one embodiment, therefore, the degree of alkoxylation is 1, 2, 3, 4, 5, 6, 7, 8, 9, or 10.

In another embodiment, the surfactant is derived from a block alkoxylated terpene, and the degree of alkoxylation from each alkoxylating group is independently from 1 to 20, such as from 1 to 15, from 1 to 12 and most preferably 1, 2, 3, 4, 5, 6, 7, 8, 9, or 10. The total degree of alkoxylation may be from 1 to 30, more preferably from 1 to 20, such as from 1 to 15, e.g. from 1 to 12.

The terpene group of the alkoxylated terpene may be a C8 to C30 terpene group. The skilled reader will appreciate that this group is a hydrophobic group. The terpene group may be acyclic or cyclic.

In one embodiment, the surfactant is an alkoxylated terpene based on a C8 to C24 terpene group. In one embodiment, the surfactant is an alkoxylated terpene based on a C8 to C22 terpene group. In one embodiment, the terpene is a C9 to C24 terpene group, C9 to C22 terpene group, or C9 to C15 terpene group.

In one embodiment the terpene group is a C8 to C22 terpene group, such as a C8 to C20 terpene group; preferably a C8 to C16 terpene group, such as a C9, C10, C11, C12, C13, C14 or C15 terpene group.

In one embodiment the terpene group may comprise a C10 acyclic, monocyclic or bicyclic terpene radical (e.g. geraniol, limonene, terpineol, linalool, pinene, carene, sabinene, camphene or thujene); a C15 acyclic, monocyclic, bicyclic or tricyclic terpenene radical (e.g. farnesene, farnesol, zingiberene, humulene, caryophyllene, vetivazulene, guaiazulene, longifolene, copaene or patchoulol), or a C20 acyclic, monocyclic, bicyclic, tricyclic or tetracyclic terpene radical (e.g. cafestol, kahweol, cembrene, sclareol, lagochilin, labdane, stemarene, steviol, or taxadiene).

The terpene group may, in one embodiment, comprise a C8-C15 monocyclic or bicyclic terpene radical, which may optionally further comprise a C1-20 hydrocarbon divalent linking group, which links the cyclic radical to the alkoxylating groups. This C1-20 hydrocarbon divalent linking group may suitably be a C1-20 alkylene, C2-20 alkenylene, or C1-20 alkoxyene group, for example a C1-12 alkylene, C2-12 alkenylene, or C1-12 alkoxyene group, such as a C2-10 alkylene, C2-10 alkenylene, or C2-10 alkoxyene group; preferably a C2-8 alkylene, C2-8 alkenylene, or C2-8 alkoxyene group; more preferably a C2, C3, C4, C5 or C6 alkylene or alkoxyene group; most preferably a C2, C3, or C4 alkylene or alkoxyene group.

In one embodiment the terpene group comprises a bicyclo[a,b,c,]heptenyl or bicyclo[a,b,c]heptyl radical, wherein a+b+c=5 and a=2, 3, or 4; b=2 or 1; and c=0 or 1. The terpene group in this embodiment may further comprise a C1-20 hydrocarbon divalent linking group, which links the cyclic radical to the alkoxylating groups. This C1-20 hydrocarbon divalent linking group may suitably be a C1-20 alkylene, C2-20 alkenylene, or C1-20 alkoxyene group, for example a C1-12 alkylene, C2-12 alkenylene, or C1-12 alkoxyene group, such as a C2-10 alkylene, C2-10 alkenylene, or C2-10 alkoxyene group; preferably a C2-8 alkylene, C2-8 alkenylene, or C2-8 alkoxyene group; more preferably a C2, C3, C4, C5 or C6 alkylene or alkoxyene group; most preferably a C2, C3, or C4 alkylene or alkoxyene group.

Thus the terpene group may, for example, be of formula Z—Y— in which Z represents a bicyclo[a,b,c,]heptenyl or bicyclo[a,b,c]heptyl radical, wherein a+b+c=5 and a=2, 3, or 4; b=2 or 1; and c=0 or 1; and Y represents —CH$_2$—C(R$^{20}$)(R$^{21}$)— or —O—CH(R$^{22}$)—CH(R$^{23}$)—, wherein R$^{20}$, R$^{21}$, R$^{22}$, and R$^{23}$, which may be identical or different, represent hydrogen or a C1-8 (preferably C1-6 or C1-5) alkyl. Preferably, R$^{20}$, R$^{21}$, R$^{22}$, and R$^{23}$, which may be identical or different, represent hydrogen or a C1, C2, C3 or C4 alkyl. Most preferably R$^{20}$, R$^{21}$, R$^{22}$, and R$^{23}$, which may be identical or different, represent hydrogen or a C1 or C2 alkyl.

In one embodiment, the surfactant is derived from a block alkoxylated terpene, and that alkoxylated terpene is of the following formula:

in which Z represents a bicyclo[a,b,c,]heptenyl or bicyclo[a,b,c]heptyl radical, wherein a+b+c=5 and a=2, 3, or 4; b=2 or 1; and c=0 or 1; Y represents CH$_2$—C(R$^{20}$)(R$^{21}$)— or —O—CH(R$^{22}$)—CH(R$^{23}$)—, wherein R$^{20}$, R$^{21}$, R$^{22}$, and R$^{23}$, which may be identical or different, represent hydrogen or a C1-8 (preferably C1-6 or C1-4, more preferably C1 or C2) alkyl; R$^{24}$ and R$^{25}$, which may be identical or different, represent hydrogen or a C1 or C2 alkyl, provided that at least one of the radicals R$^{24}$ and R$^{25}$ is not hydrogen and provided that the total number of carbon atoms in the radicals R$^{24}$ and R$^{25}$ is 1 or 2; n is an integer from 0 to 20; and m is an integer from 1 to 50. The HLB of the alkoxylated terpene is preferably less than 10, such as 5 or less; preferably from 1 to 5 and more preferably from 3 to 5

This type of terpene product is, for example, described in US Patent Publication No: 2006/0135683 and in WO 2009/023724.

In one such embodiment, Z represents a bicyclo[a,b,c,]heptenyl or bicyclo[a,b,c]heptyl radical, wherein a+b+c=5 and a=2, 3, or 4; b=2 or 1; and c=0 or 1; Y represents —CH$_2$—CH$_2$— or —O—CH$_2$—CH$_2$—; R$^{24}$ and R$^{25}$, which may be identical or different, represent hydrogen, CH$_3$ or C$_2$H$_5$, provided that at least one of the radicals R$^{24}$ and R$^{25}$ is not hydrogen and provided that the total number of carbon atoms in the radicals R$^{24}$ and R$^{25}$ is 1 or 2; n is an integer from 1 to 20; and m is an integer from 1 to 20.

Preferably, in this embodiment the alkoxylated terpene is of the following formula:

wherein R$^s$ is CH$_3$ or C$_2$H$_5$, n is an integer from 1 to 20 and m is an integer from 1 to 30. Most preferably, R$^s$ is CH$_3$, n is an integer from 1 to 20 and m is an integer from 1 to 20. For example, it may be that R$^s$ is CH$_3$, n is an integer from 1 to 10 and m is an integer from 1 to 10.

Accordingly, in one embodiment it is preferred that the terpene is 6,6-dimethylbicyclo[3.1.1]hept-2-ene-2-ethanol (CAS No: 128-50-7).

In this embodiment, therefore the surfactant is derived from a block alkoxylated (PO)(EO) terpene based on 6,6-dimethylbicyclo[3.1.1]hept-2-ene-2-ethanol (CAS No: 128-50-7). The number of propoxy groups is preferably from 1 to 20 (e.g. from 1 to 10) and the number of ethoxy groups is preferably from 1 to 20 (e.g. from 1 to 10). The HLB of the alkoxylated terpene is preferably less than 10, such as 5 or less; preferably from 1 to 5 and more preferably from 3 to 5.

In one embodiment, the terpene alkoxylate derivative is based on the following alkoxylated terpene:

and the derivative is an ester thereof, e.g. a phosphate ester or a sulfate ester or a carbonate ester or a carboxylate ester.

It may suitably be any of the options for Z defined above. In particular, it may be a phosphate ester in accordance with formula (IV-a) above.

The surfactants used in the invention can be prepared using conventional methods.

Figure 1:
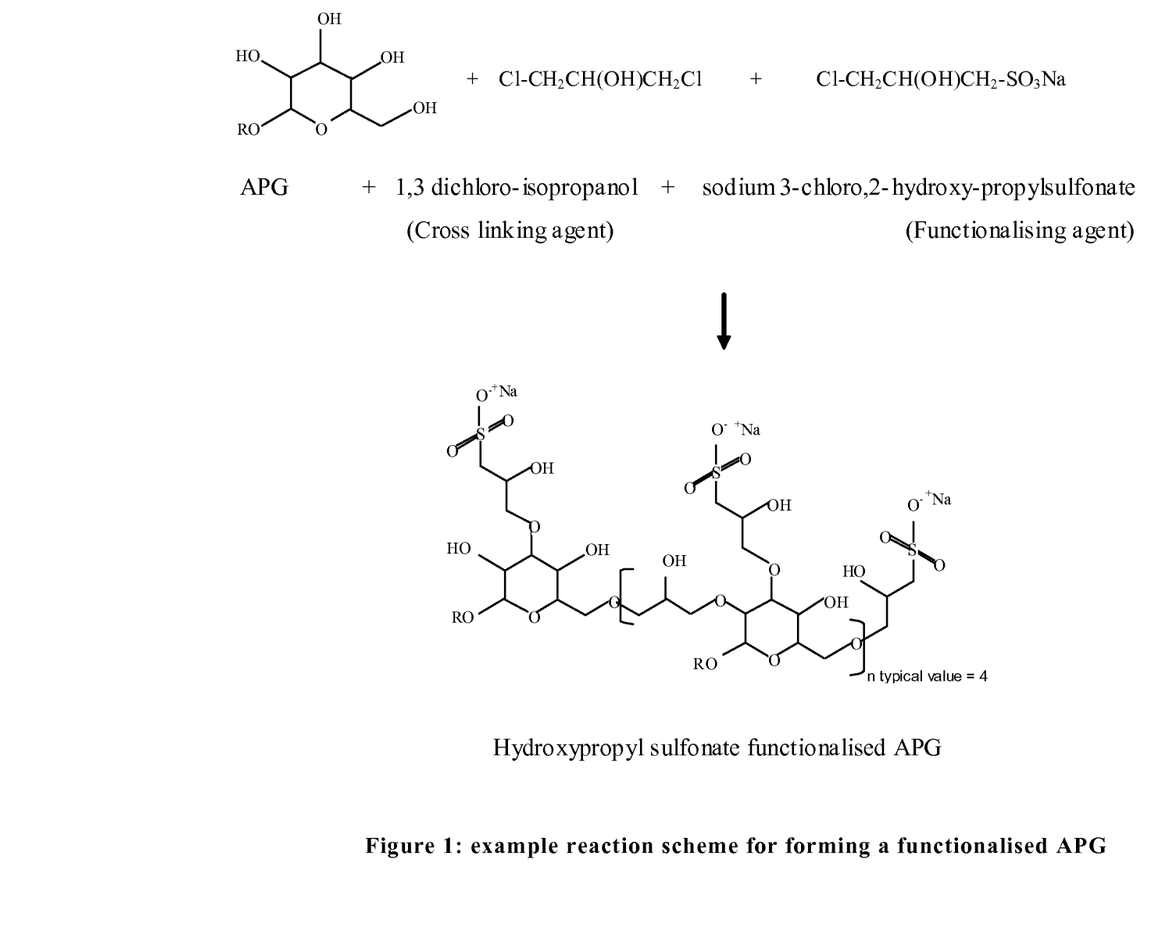
FIG. 1 is a reaction scheme for forming a functionalised APG in accordance with one embodiment of the present invention.

The synthesis of these functionalised APGs is described in U.S. Pat. Nos. 6,627,612 and 7,507,399. An example of synthesising a hydroxypropyl sulfonate co-polymer APG is set out in FIG. 1.

A phosphate ester derivative of a terpene alkoxylate can be made by the reaction of the terpene alkoxylate with polyphosphoric acid. The use of a 3:1 molar ratio will predominantly obtain the monoester product. The reaction is carried out at 50-70° C., with the polyphosphoric acid being added slowly to avoid excessive temperature rises and thermal degradation of the terpene alkoxylate. The viscosity of the reaction product may be adjusted using a suitable solvent, e.g. ethylene glycol. The preferred purity of the polyphosphoric acid is 95-118%, expressed as the apparent $H_3PO_4$ content.

Figure 2:
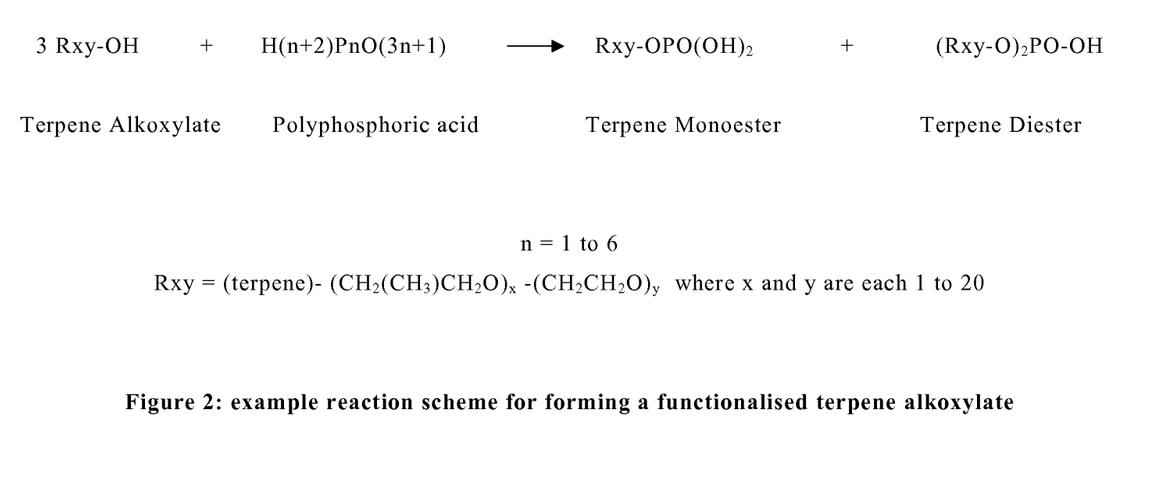
FIG. 2 is a reaction scheme for forming a functionalised terpene alkoxylate in accordance with one embodiment of the present invention.

A reaction scheme for obtaining a phosphate ester functionalised terpene alkoxylate is shown in FIG. 2.

The skilled reader will appreciate that the starting raw materials for these syntheses are readily available. Additionally, many of the surfactants of the invention are commercially available and reaction chemistries are well known, as well as manufacturing routes being described in text books on surfactants. Synthesis of alkyl polyglucosides is well known and can be found in any text book covering such surfactants, e.g. Alkyl Polyglucosides: Technology, Properties and Applications, eds K Hill, W von Rybinski and G Stoll (Wiley, (1996)).

The amount of surfactant used may be any suitable amount to reduce or inhibit corrosion of the metal component. In one embodiment it may be used at a level of 1 ppm or more with respect to the aqueous fluid, such as from 1 ppm to 1000 ppm, e.g. from 1 ppm to 500 ppm. It may be that the amount of surfactant is from 2 to 200 ppm, such as from 3 to 150 pmm or from 4 to 100 ppm. In one embodiment, the amount of surfactant is from 5 to 50 ppm, such as from 10 to 40 ppm or from 15 to 30 ppm.

The surfactant may be used in the same manner as a conventional corrosion inhibitor.

The surfactant may suitably be used to inhibit corrosion of a metal component in an industrial aqueous system, where the metal component is (or will be) in contact with an aqueous fluid.

The industrial aqueous system may, in one embodiment, be an aqueous system in a hydrocarbon plant; this may be a plant for exploration, recovery, refining or distribution of hydrocarbon. For example, the aqueous system may be an oil or gas plant. In one such embodiment the aqueous system is an oilfield system, such as an oilfield production system or an oilfield distribution system. In another such embodiment the aqueous system is a downstream oil-related system, such as an oil refining system. Preferred industrial aqueous systems may be aqueous systems in topside oilfield locations.

The industrial aqueous system may in an alternative embodiment be an aqueous system in a chemical plant, e.g. a chemical manufacturing, processing or distribution plant.

The industrial aqueous system may in another alternative embodiment be a water plant, e.g. an industrial water treatment or distribution system.

The industrial aqueous system may in another alternative embodiment be a paper manufacturing plant.

In one embodiment, the aqueous fluid is at a temperature of 100° C. or less, such as 90° C. or less, e.g. 80° C. or less, or 70° C. or less, or 60° C. or less.

The aqueous fluid may be flowing or may be stationery. Thus the aqueous fluid may, for example, be in a pipe or other conduit or may be in a tank or other storage container.

The metal component may therefore be a pipe or other conduit or may be a tank or other storage container.

The aqueous fluid may be acidic, neutral or basic. In one embodiment the aqueous fluid has, or will have, acidic conditions, i.e. a pH of less than 7.

In one embodiment, the aqueous fluid comprises water and further comprises, or will further comprise, one or more acidifying compounds, such as carbon dioxide or hydrogen sulphide.

In one embodiment, the aqueous fluid comprises water and a hydrocarbon, such as oil, and further comprises, or will further comprise, one or more acidifying compounds, such as carbon dioxide or hydrogen sulphide.

The metal component may comprise any metal that is prone to corrode following a time of exposure to an aqueous fluid, especially an acidic aqueous fluid. It may comprise a metal alloy or a single metal. The metal component may in particular comprise ferrous materials (e.g. steel), copper, and/or aluminium.

In one embodiment the metal component comprises steel, such as mild steel, carbon steel, stainless steel (including precipitation-hardened stainless steel), chrome steel, duplex steel, martensitic alloy steel, ferritic alloy steel, austenitic stainless steel, or high nickel content steel.

The surfactant may be applied to the metal component and/or may be added to the aqueous fluid. In one embodiment the surfactant is added to the aqueous fluid.

The surfactant may be applied to the metal component before the metal component is in contact with the aqueous fluid and/or may be applied once the metal component is in contact with the aqueous fluid.

The surfactant may be added to the aqueous fluid before the aqueous fluid is in contact with the metal component and/or may be added to the aqueous fluid once the aqueous fluid is in contact with the metal component.

The surfactant may be used with one or more additional components. These additional components may have been pre-mixed with the surfactant, or may be added simultaneously with the surfactant, or sequentially with the surfactant, or separately from the surfactant. They may be added before the surfactant or after the surfactant.

The additional components may, for example, be selected from: corrosion inhibitors that are not the surfactants of the invention; additional surfactants; solvents; demulsifiers; antifoam agents; scale inhibitors; dispersants; and biocides.

When a corrosion inhibitor that is not the surfactant of the invention is used as an additional component, that additional corrosion inhibitor may be selected from non-ionic, anionic, cationic and amphoteric corrosion inhibitors. It may, for example, be selected from: sodium tripolyphosphate, sodium ethylenediamine tetracetate, sodium nitrilo triacetate, tetra potassium pyrophosphate, acetodiphosphonic acid and its salts, ammonium trismethylene phosphonic acid and its salts, ethylenediamine tetrakis(methylene phosphonic) acid and its salts, diethylenetriamine pentakis(methylene phosphonic) acid, hexamethylenediamine tetrakis(methylene phosphonic) acid, bishexamethylenetriamine pentakis (methylene phosphonic) acid, and ethanolamine bis (methylenephosphonic) acid and its salts.

In one embodiment, the additional corrosion inhibitor is an amphoteric corrosion inhibitor, such as an inhibitor selected from alkylamidopropyl betaines, alkylamidopropyl sultaines, alkyl ampho(di)acetates, and alkyl amphohydroxypropyl sulfonates and propionates, which may be based on lauric acid, coconut oil, palm oil, oleic acid, castor oil, tall oil or ricinoleic acid.

In one embodiment, the additional corrosion inhibitor is a non-ionic corrosion inhibitor, such as an inhibitor selected from fatty diamine derivatives of oleic or tall oil fatty acids, and fatty acid alkanolamides such as monoisopropyl oleamide.

In one embodiment, the additional corrosion inhibitor is an anionic corrosion inhibitor, such as an inhibitor selected from alkyl and alkyl ether phosphate esters, acyl sarcosinates, taurides and alkyl ether carboxylic acids.

In one embodiment, the additional corrosion inhibitor is a cationic corrosion inhibitor, such as an inhibitor selected from quaternary ammonium salts, such as alkyl trimethyl ammonium halides or benzalkonium derivatives, fatty amines, amidoamines (including alkylamidopropyl amines and imidazolines). For example, it may be an alkyl hydroxyethyl or alkyl aminoethyl derivative of oleic or tall oil fatty acids.

When an additional surfactant is used as well as the corrosion inhibiting surfactant of the invention, the additional surfactant may be a cationic surfactant (for example it may be selected from benzalkonium salts, C10-20 alkyl trimethyl ammonium salts, and C10-20 alkyl trimethyl or tris (hydroxymethyl) phosphonium salts).

Alternatively, the additional surfactant may be anionic (for example it may be selected from C10-20 alkyl benzene sulphonates, C10-20 olefin sulphonates, C10-20 alkyl sulfates, C10-20 alkyl 1 to 25 mole ether sulfates, C10-20 paraffin sulphonates, C10-20 alkyl phenol sulfates, lignin sulphonates, fatty ester sulphonates, C10-20 alkyl phenol ether sulfates, C10-20 alkyl ethanolamide sulfates, and C10-20 alpha sulphofatty acid salts).

The additional surfactant might also be amphoteric (for example it may be selected from betaines, sulphobetaines, and quaternized imidazoline).

The additional surfactant might alternatively be non-ionic (for example it may be selected from ethoxylated fatty acids, ethoxyl/propyleneoxy block copolymers, ethoxylated fatty amines, mono- and di-alkanolamides, amine oxides and C10-20 acyl sorbitan and glyceryl ethoxylates).

When a solvent is used as an additional component, the solvent may be aqueous or may be organic. The solvent may be any suitable solvent that is compatible with the aqueous fluid. Examples of solvents include water, dimethyl sulfoxide (DMSO), alkylene glycols, glycol ethers, and tetrahydrofuran (THF).

A demulsifier may, in particular, be beneficial as an additional component when the surfactant is being used in oilfield applications. Examples of demulsifers include phenol-formaldehyde resins; polyamines; di-epoxides; and polyols.

When an antifoam agent is used as an additional component, the antifoam agents that may be considered include silicone defoamers and acetylenic diols.

When a scale inhibitor is used as an additional component, the scale inhibitor may, for example, be selected from polyacrylates; polymaleates; polysulfonates; phosphonates; and bisphosphonates When a dispersant is used as an additional component, the dispersant may, for example, be selected from polymaleic acids, polyacrylic acids and polyvinylsulphonic acids.

When a biocide is used as an additional component, the biocide may, for example, be a quaternary ammonium or phosphonium compound, such as an ADBAC quaternary ammonium compound, or a tetrakis (hydroxymethyl) phosphonium salt, or formaldehyde glutaraldehyde.

The corrosion inhibitor formulation of the third aspect may be used in the inventions of the first or second aspect. Alternatively, the inventions of the first and second aspect may add or apply the surfactant of the invention and any additional corrosion inhibitors separately. Alternatively, the inventions of the first and second aspect may use only the surfactants of the invention as the corrosion inhibitor.

The corrosion inhibitor formulation of the third aspect may comprise the corrosion inhibiting surfactant of the invention together with a corrosion inhibitor that is not a corrosion inhibiting surfactant according to the invention, wherein this corrosion inhibitor is selected from non-ionic, anionic, cationic and amphoteric corrosion inhibitors.

The corrosion inhibitor formulation may in one embodiment comprise from 10 to 99 wt % corrosion inhibiting surfactant, such as from 50 to 95 wt % corrosion inhibiting surfactant. The corrosion inhibitor formulation may in one embodiment comprise from 1 to 90 wt % of corrosion inhibitor that is not the corrosion inhibiting surfactant, such as from 5 to 50 wt % of corrosion inhibitor that is not the corrosion inhibiting surfactant.

The formulation may further include additional components, which may for example be selected from: surfactants; solvents; demulsifiers; antifoam agents; scale inhibitors, dispersants, and biocides. These components are discussed in more detail above.

The invention will now be further described, in a non-limiting manner, with reference to the following Examples.

EXAMPLES

Example 1

Linear Polarisation Resistance (LPR) Test

A modified version of the bubble test was used to compare the corrosion inhibition performance of various corrosion inhibiting surfactants according to the invention with the industry standard corrosion inhibitor, tall oil aminoethyl imidazole, under oilfield conditions.

The products tested were as set out in Table 1 below:

TABLE 1

Products tested

| Product | Chemical name | Activity % |
|---|---|---|
| PolySugaNate 100P (from Colonial Chemicals) | Sodium hydroxypropyl sulfonate Decyl glucose crosspolymer | 40.5 |
| PolySugaNate 160P (from Colonial Chemicals) | Sodium hydroxypropyl sulfonate Lauryl glucose crosspolymer | 38.6 |
| PolySugaPhos 1200P (from Colonial Chemicals) | Poly sodium Lauryl glucoside hydroxypropyl phosphate | 40.1 |
| PolySugaBetaine L (from Colonial Chemicals) | Lauryl Glucoside Betaine crosspolymer | 40 |
| PolySugaQuat TM8610P (from Colonial Chemicals) | Hydroxypropyltrimonium Coco glucosides Chloride | 41.8 |
| PolySugaQuat S-1210P (from Colonial Chemicals) | Stearyldimoniumhydroxypropyl Lauryl glucosides Chloride | 30 |

TABLE 1-continued

Products tested

| Product | Chemical name | Activity % |
|---|---|---|
| Rhodoline HP Half ester Sulfosuccinate (from Rhodia Novecare) | Terpene alkoxylate half ester sulfosuccinate (based on block alkoxylated (EO)(PO) C9 terpene, where the terpene alkoxylate has an HLB in the range of from 3 to 5) | 35 |
| Rhodoline HP Phosphate Ester (from Rhodia Novecare) | Terpene alkoxylate phosphate ester (based on block alkoxylated (EO)(PO) C9 terpene, where the terpene alkoxylate has an HLB in the range of from 3 to 5) | 99.7 |
| Mackterra TDI | Tall oil aminoethyl imidazoline (industry standard) | 100 |

The alkoxylated terpene used in the terpene-based products is shown below:

Method
Each cell was charged with the desired weight of brine (5% NaCl solution) and oil (C11-15 isoparaffin fluid Isopar™ M).
Every cell had a stirring bar, auxiliary electrode, reference electrode, gas sparge tube, and glass periscope inserted.
The cells were placed in a water bath set at 60° C. and set to stir at approximately 300 rpm.
Each cell was connected to a constant sparge of $CO_2$ and then left for 1 hour to reach equilibrium.
C1018 mild steel coupons were washed with xylene and acetone and allowed to dry to ensure the surfaces were free from oils/grease.
After the cells reached equilibrium, the mild steel coupons were connected to the working electrodes and inserted into each cell using the glass periscopes (to avoid getting the electrode oil wet).
The LPR run was started and baseline corrosion data was collected for approximately 2.5 hours.
During this time 20000 ppm w/w active stock solutions of the surfactants and the tall oil aminoethyl imidazole were made up. The tall oil aminoethyl imidazole was made up in isoparaffin fluid Isopar™ M, because it is not water soluble. The alkyl polygluconate surfactants were made up in a 5% NaCl brine. The terpene alkoxylated surfactants were made up in methanol.
After the baseline corrosion data was collected the stock solutions were injected into the cells at a concentration of 20ppm actives and the corrosion rate in each cell was recorded for a further 12.5 hours.
Corrosion efficiency was also calculated as:

[Baseline corrosion−corrosion at 15 hours]×100
Baseline corrosion where baseline corrosion was calculated by taking the average corrosion rate of each cell before the corrosion inhibitors were introduced.
A summary of the conditions for the LPR test is shown in Table 2.

TABLE 2

Tabulated LPR Conditions

| Condition | Description |
|---|---|
| Brine | 5% NaCl |
| Oil phase | Isopar M |
| Brine Oil Ratio | 9:1 |
| Temperature | 60° C. |
| Gas Sparge | Constant $CO_2$ |
| Stirring speed | ~300 rpm |
| Working electrode | Mild Steel C1018 |
| Reference electrode | Ag/AgCl (saturated in KCl) |
| Auxiliary electrode | Platinum |
| Inhibitor Concentration | 20 ppm actives |
| Test period | 15 hours |

Results and Discussion

Figure 5:
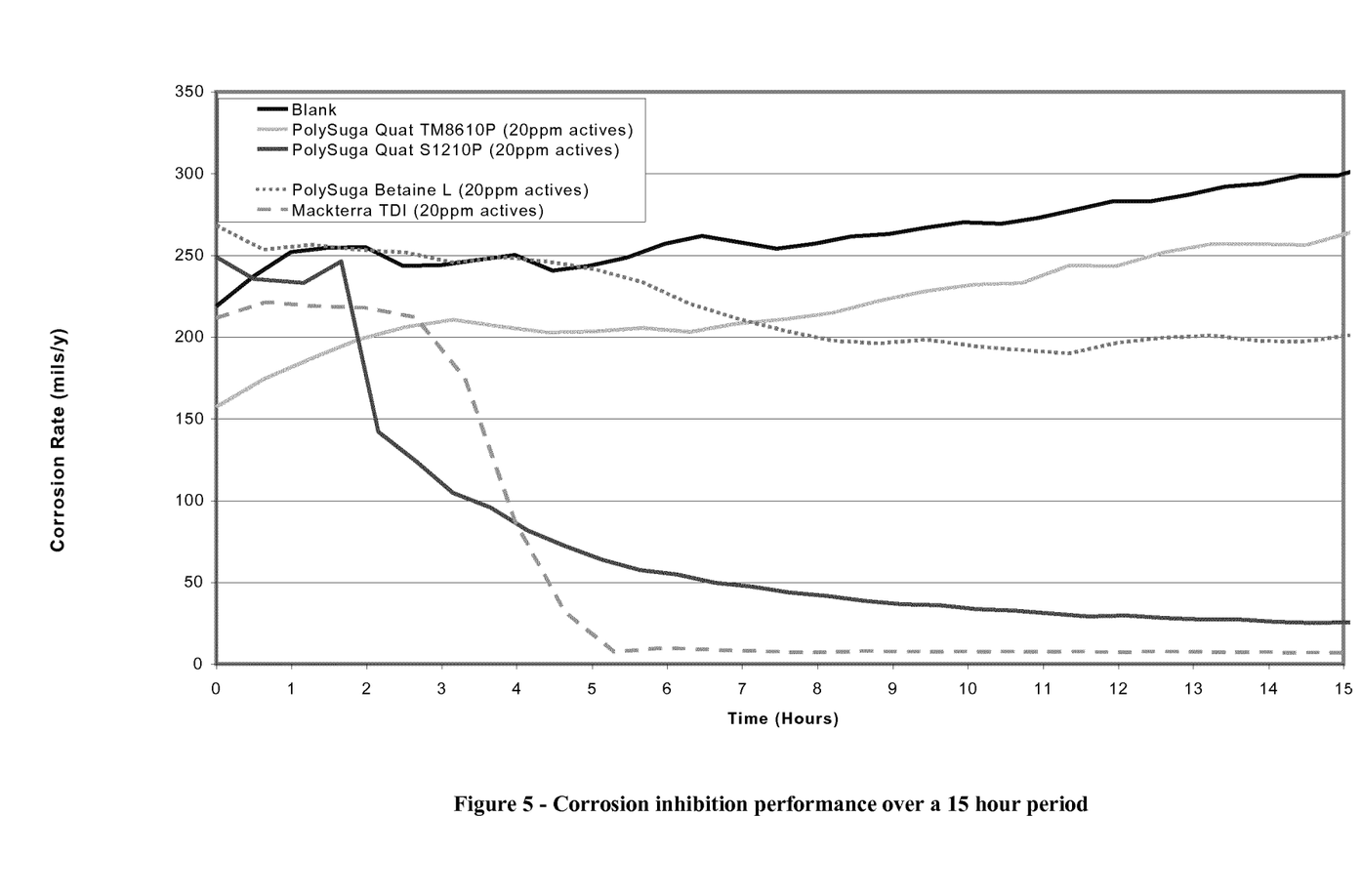
FIG. 5 represents the results of Corrosion inhibition performance over a 15 hours period in accordance with yet another embodiment of the present invention.
Figure 6:
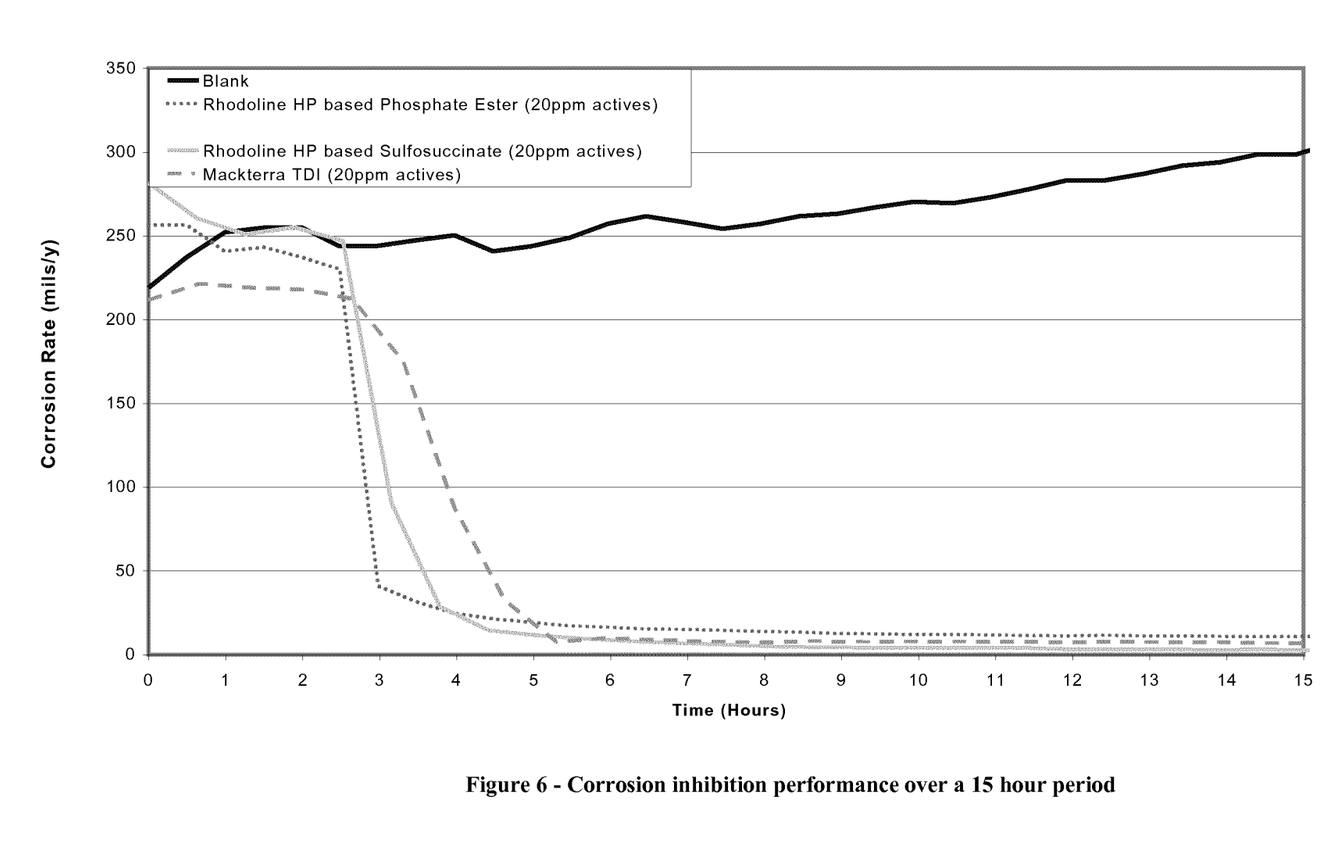
FIG. 6 represents the results of Corrosion inhibition performance over a 15 hours period in accordance with yet another embodiment of the present invention.
Figure 7:
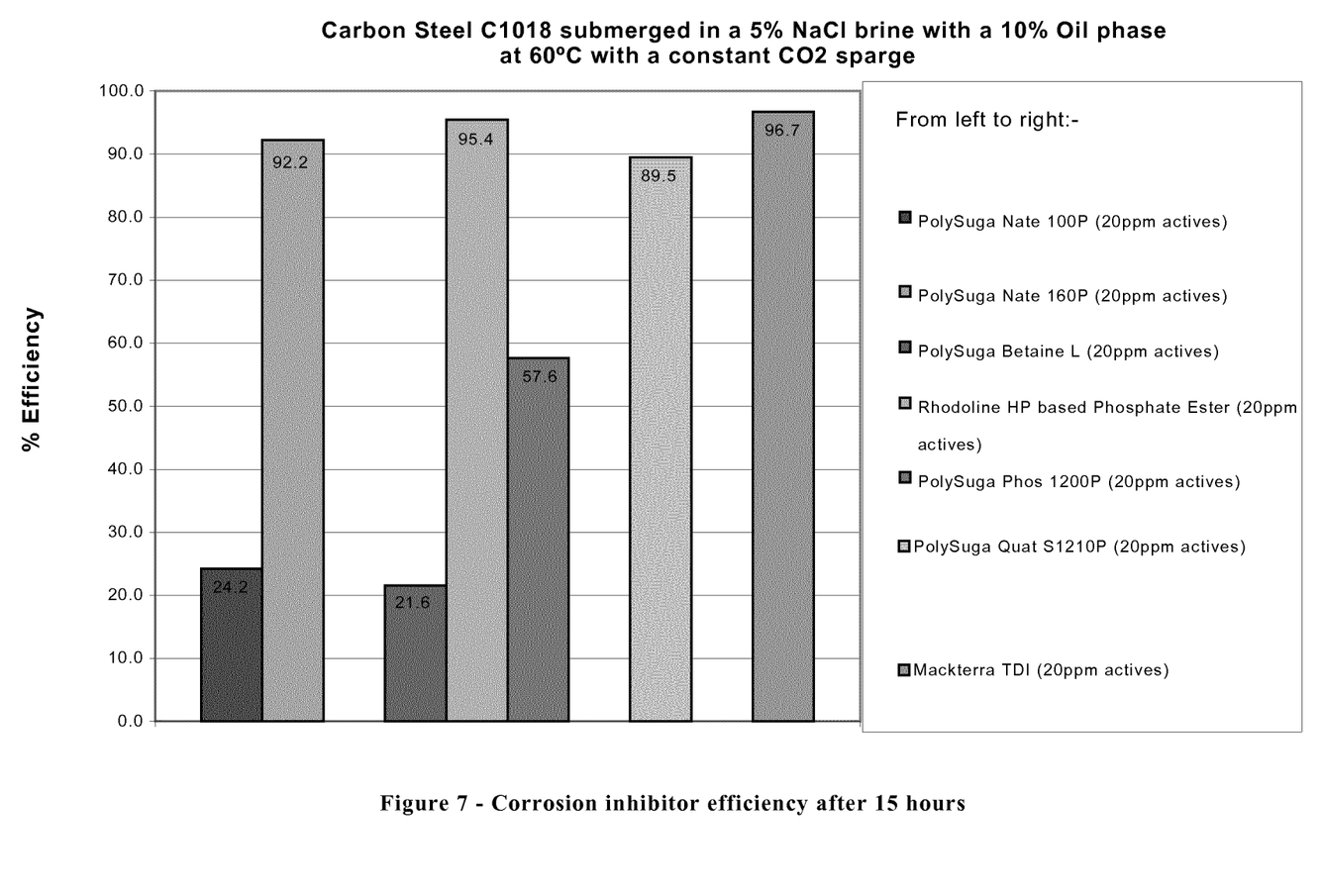
FIG. 7 represents the results of Corrosion inhibition efficiency after 15 hours in accordance with one embodiment of the present invention.

The results are shown in FIGS. 3-6 (corrosion rate) and FIG. 7 (corrosion efficiency).

Figure 3:
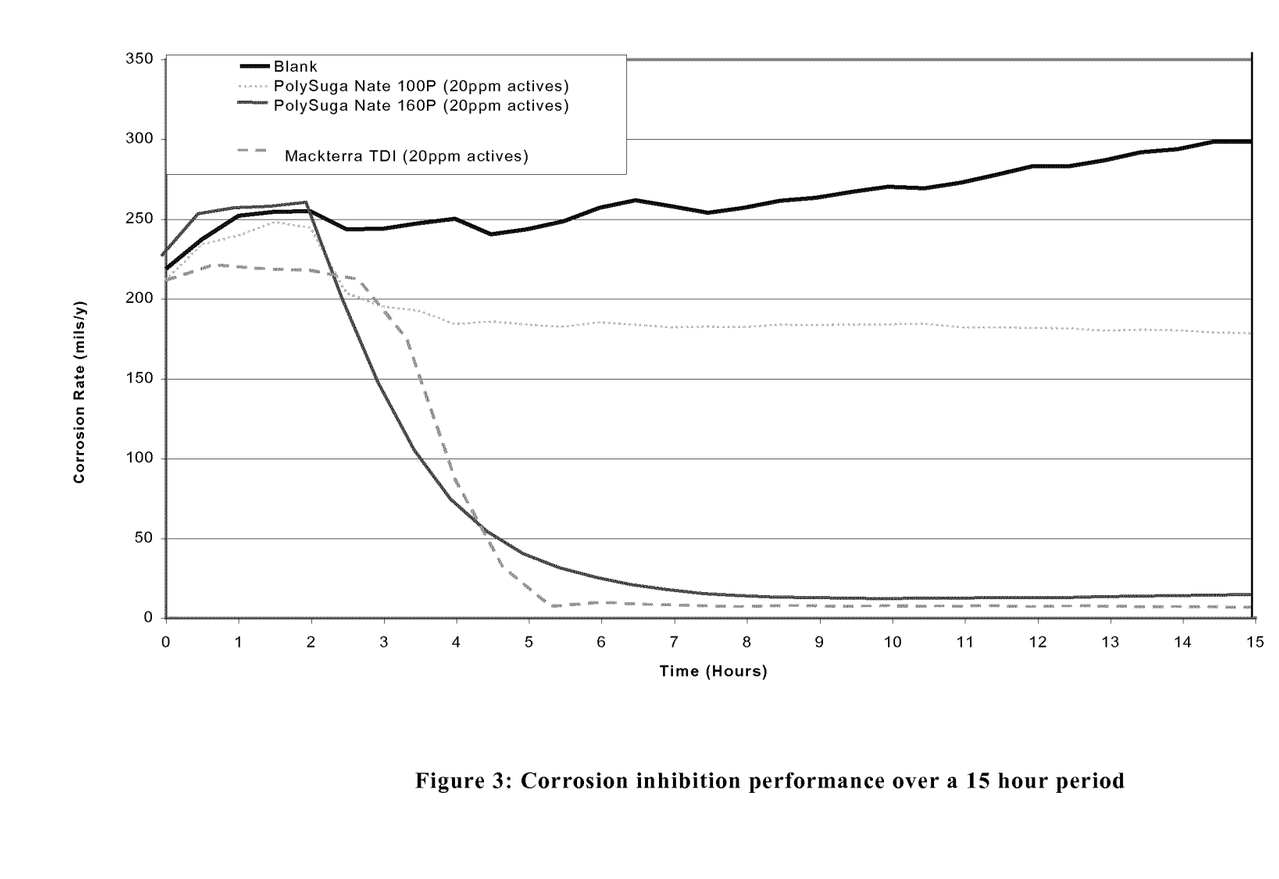
FIG. 3 represents the results of Corrosion inhibition performance over a 15 hours period in accordance with one embodiment of the present invention.

In FIG. 3 it can be seen that both Sodium hydroxypropyl sulfonate Decyl glucose crosspolymer and Sodium hydroxypropyl sulfonate Lauryl glucose crosspolymer reduce the observed corrosion rates under oilfield conditions. Sodium hydroxypropyl sulfonate Lauryl glucose crosspolymer acts to form a protective film around the working electrode quicker than the industry standard (tall oil aminoethyl imidazole).

Figure 4:
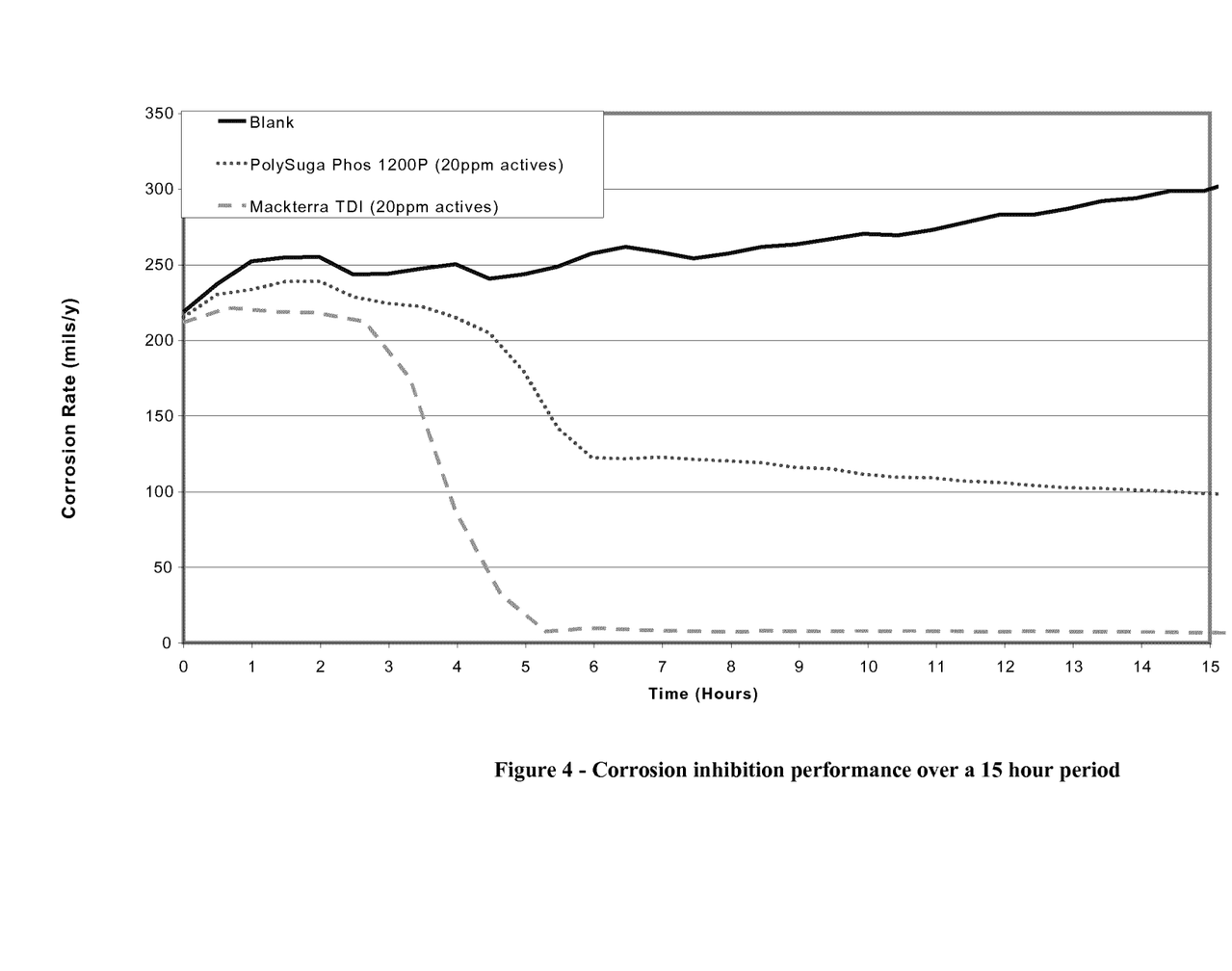
FIG. 4 represents the results of Corrosion inhibition performance over a 15 hours period in accordance with another embodiment of the present invention.

In FIG. 4 it can be seen that Poly sodium Lauryl glucoside hydroxypropyl phosphate reduces the observed corrosion rates under oilfield conditions.

In FIG. 5 it can be seen that Lauryl Glucoside Betaine crosspolymer, Hydroxypropyltrimonium Coco glucosides Chloride and Stearyldimoniumhydroxypropyl Lauryl glucosides Chloride reduce the observed corrosion rates under oilfield conditions. Stearyldimoniumhydroxypropyl Lauryl glucosides Chloride acts to form a protective film around the working electrode quicker than the industry standard (tall oil aminoethyl imidazole).

In FIG. 6 it can be seen that the terpene alkoxylate phosphate ester reduces the observed corrosion rates under oilfield conditions. This acts to form a protective film around the working electrode quicker than the industry standard (tall oil aminoethyl imidazole). The half ester sulfosuccinate is also effective (but is not claimed in the present application).

FIG. 7 shows that various surfactants in accordance with the invention have good corrosion efficiencies. The sodium hydroxypropyl sulfonate lauryl glucose crosspolymer, the stearyldimoniumhydroxypropyl lauryl glucosides chloride, and the terpene alkoxylate phosphate ester can all be seen to significantly reduce the corrosion rate and these have a performance very similar to the industry standard (tall oil aminoethyl imidazoline).

The effects for the poly sodium lauryl glucoside hydroxypropyl phosphate are still good and a larger molecular weight will reduce bioaccumulation. Therefore in at least some situations the advantage of non-bioaccumulation would be considered to outweigh the slight reduction in effectiveness as a corrosion inhibitor.

CONCLUSION

These examples show that a range of surfactants which are derivatives of alkyl polyglucosides and derivatives of terpene alkoxylates exhibit corrosion inhibition properties for metal in an aqueous environment.

The invention claimed is:

1. A method for inhibiting corrosion of a metal component in contact with an aqueous fluid in an industrial aqueous system, wherein the industrial aqueous system is an aqueous system in a hydrocarbon plant; a chemical plant; a water plant; or a paper manufacturing plant, said method comprising applying a surfactant to the metal component or adding the surfactant to the aqueous fluid that is in contact with the metal component, wherein the surfactant is selected from the group consisting of derivatives of an alkyl polyglucoside, wherein the derivatives of an alkyl polyglucoside are reaction products of an alkyl polyglucoside with a cross linking agent and a functionalizing agent, wherein the derivatives are not sulfosuccinates.

2. The method of claim 1, wherein the crosslinking agent is of formula X—Ra—X, where each X, which may be the same or different, is a halogen and Ra is a C2-C 18 hydrocarbon group that may optionally be substituted and that may be branched or unbranched.

3. The method of claim 1, wherein the functionalizing agent is of formula X—Ra—Y, where X is a halogen, Ra is a C2-C18 hydrocarbon group that may optionally be substituted and that may be branched or unbranched, and Y is selected from the group consisting of quaternary ammonium groups, sulfonate groups, sulfate groups, phosphate groups, and hydroxy groups.

4. The method of claim 1, wherein the alkyl polyglucoside has a degree of polymerisation of from 1 to 10.

5. The method of claim 1, wherein the alkyl polyglucoside has an alkyl group that is a C8 to C30 branched or unbranched alkyl group.

6. The method of claim 1 wherein the aqueous fluid is acidic.

7. The method of claim 1 wherein the metal component comprises ferrous material, copper, and/or aluminium.

8. The method of claim 1 wherein the surfactant is used together with one or more component selected from the group consisting of corrosion inhibitors that are not surfactants as defined in claim 1, surfactants that are not as defined in claim 1; solvents; antifoam agents; demulsifiers; scale inhibitors; dispersants and biocides.

9. The method of claim 1 wherein the amount of surfactant used is from 1 ppm to 1000 ppm.

* * * * *